C. J. WHITE.
TRACTOR.
APPLICATION FILED AUG. 15, 1919.
1,349,930.   Patented Aug. 17, 1920.
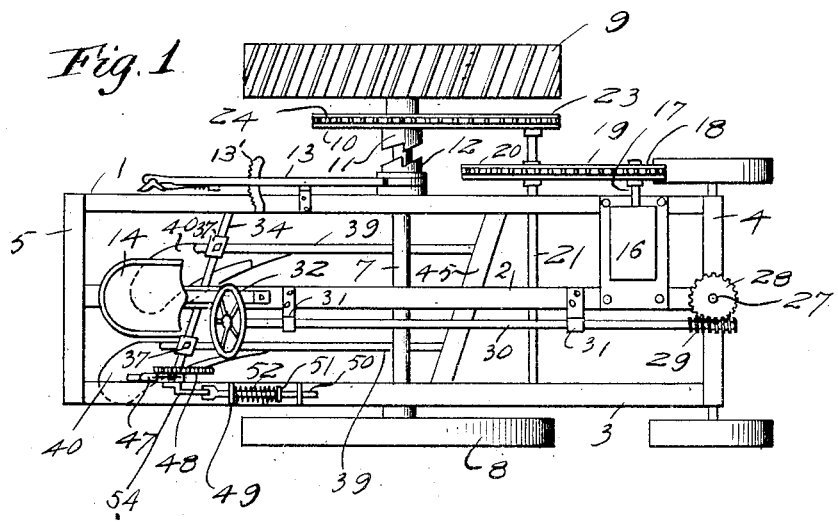
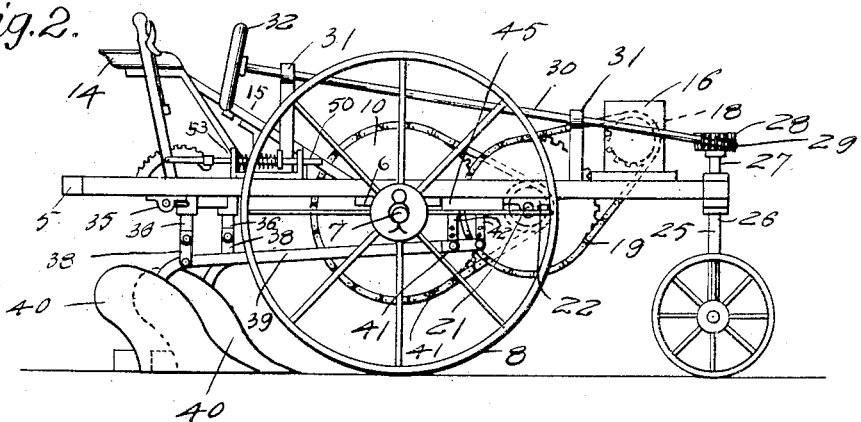
Inventor
C. J. White,
By [signature], Atty.

UNITED STATES PATENT OFFICE.

CHARLES J. WHITE, OF PAWNEE, LOUISIANA.

TRACTOR.

1,349,930.

Specification of Letters Patent.   Patented Aug. 17, 1920.

Application filed August 15, 1919.  Serial No. 317,738.

*To all whom it may concern:*

Be it known that I, CHARLES J. WHITE, a citizen of the United States, residing at Pawnee, in the parish of Allen and State of Louisiana, have invented certain new and useful Improvements in Tractors; and I do hereby declare the following to be a full, clear, and exact description of the invention, such as will enable others skilled in the art to which it appertains to make and use the same.

This invention relates to tractors, and more particularly to a tractor engine specially adapted for use in connection with agricultural operations.

The primary object of the invention is to provide a tractor of simple construction and operation which may be driven by a low power engine thus effecting a material saving in fuel consumed.

A further object is to provide a tractor composed of a minimum of parts having a single main drive wheel so arranged as to permit short turns to be readily made.

Further objects will appear from the detailed description.

In the drawings:

Figure 1 is a top plan view of a tractor constructed in accordance with my invention.

Fig. 2 is a side view of the same.

The main frame of the tractor is composed of the spaced parallel longitudinally extending beams 1, 2 and 3 which are rigidly held in proper relation by front and back transverse beams 4 and 5, respectively, secured thereto. The beams 1, 2 and 3 are provided on their under faces with bearing blocks 6 secured thereto which rotatably support a transverse axle 7 on one end of which is loosely mounted a ground wheel 8 for free rotation. A relatively broad main drive wheel 9 is secured on the other end of the axle for propelling the tractor when the axle is rotated, this drive wheel being provided with suitable gripping elements or cleats extending transversely of the rim thereof at an inclination, as illustrated. A relatively large sprocket wheel 10 is mounted on the axle for free rotation adjacent the inner end of the hub of wheel 9, this sprocket wheel being provided at its inner face with an inwardly extending clutch element 11 which coöperates with a clutch member 12 feathered on the axle and shifted into and out of operative position by a shifting lever 13 mounted upon beam 1 and secured in adjustment by the usual spring pressed detent which coöperates with a rack 13' also carried by bar 1. This lever extends rearwardly so as to be readily accessible from the operator's seat 14 supported upon the central bar 2 by a standard 15 of well known construction.

An internal combustion engine 16 of suitable type, preferably an engine of six horse power, is supported by the main frame adjacent the forward end thereof. The drive shaft 17 of this engine projects laterally of the main frame and is provided with a relatively small sprocket wheel 18 secured thereto which is connected by a sprocket chain 19 to a relatively large sprocket wheel 20 secured on a countershaft 21 extending transversely of the frame and rotatably supported in bearing blocks 22 secured to the under faces of beams 1, 2 and 3. This countershaft is provided at its outer end with a relatively small sprocket 23 secured thereon which is connected by a chain 24 to the relatively large sprocket wheel 10 rotatable on axle 7. When the engine is in operation, by shifting the clutch member 12 into engagement with clutch element 11 of the sprocket wheel, rotation will be imparted to shaft 7 so as to rotate the main drive wheel 9 thus propelling the tractor. As ground wheel 8, which is adapted to travel in the furrow, is mounted for free rotation on shaft 7, the tendency could be to turn the tractor about this ground wheel as a pivot. During the plowing operation, however, the action of the plows will overcome this tendency, the furrow wheel 8 being held in engagement with the land side of the furrow so as to automatically steer the plow during the plowing operation in the well known manner, thus insuring that the tractor and the plows carried thereby will be driven straight forward in parallelism with the furrows previously turned. When the end of the furrow is reached, however, the plows are lifted from the ground and a very short turn may be readily made about wheel 8 as a pivot, the turning of the plow being modified or controlled by front steering wheels and steering gear therefor, to be described.

A short crank axle 25 is provided at the front of the frame, this axle being provided at the center of its bight portion with a bearing plate 26 and a central vertical stub shaft 27 which is mounted for rotation through a suitable bearing sleeve carried by the front beam 4, this shaft being held against vertical movement by bearing and spacing collars in the known manner. A worm gear 28 is secured on the shaft 27 adjacent the upper end thereof and is in mesh with a worm 29 carried at the forward end of a steering post 30 rotatably supported in suitable standards 31 carried by the frame and provided with a steering wheel 32 at its rearward end positioned so as to be readily accessible from the seat 14. By means of the steering wheels 33 which are rotatably mounted at each end of the axle 25, the tendency of the main drive wheel 9 to turn the tractor toward the right hand side as considered from the direction of travel about ground wheel 8 as a pivot, may be modified or neutralized so as to cause the machine to travel straight forward or so as to make a very short turn, as may be desired.

For plowing purposes, a hanger shaft 34 is rockably mounted adjacent the rearward end of the frame, and at an inclination transversely thereof, in bearing blocks 35 carried by the beams 1, 2 and 3. This shaft is of substantial rectangular cross section and is provided with a plurality of hanger arms 36 adjustably secured thereon by set screws 37 or equivalent means. The lower ends of these arms are connected by links 38 to standards 39 of plows 40 of suitable type. The forward ends 41 of the plow beams are connected to the hangers 42 which fit snugly in a channel beam 43 carried by the main frame adjacent the forward end thereof, this beam being inclined transversely of the frame in parallelism with the shaft 34. When desired, the plows may be replaced by suitable cultivating plows, the front arched axle 25 being adapted to straddle rows of plants for cultivating purposes, thus readily adapting the machine for either plowing or cultivating operations.

For raising and lowering the plows or other implements carried by the shaft 16, a hand lever 47 is secured to the shaft in position to be readily accessible from seat 14. This lever is provided with a detent which coacts with a rack 48 carried by beam 3 to secure the lever in rocked adjustment. A substantially U-shaped bracket 49 is secured on the upper face of beam 3 and is provided with alined openings through its end arms which slidably receive a rod 50 adjacent the forward end of which is secured a collar 51 against which abuts the forward end of an expansion coil spring 52 mounted about the rod and confined between the collar and the rearward end arm 53 of the bracket. The rearward end of rod 50 is loosely secured to one end of a link 54 the rearward end of which is pivoted to lever 47 above the pivotal axis thereof. The spring acts through its expansive force to assist in raising the plows, thus permitting easy lifting of the same while providing a cushioning device to prevent the plows from being lowered too quickly and abruptly stopped.

It will be evident that there may be slight changes made in the construction and arrangement of the details of my invention without departing from the field and scope of the same, and I intend to include all such variations, as fall within the scope of the appended claims, in this application in which a preferred form only of my invention is diclosed.

What I claim is:

In a tractor, a main supporting frame, an axle rotatably mounted thereon, a ground wheel mounted on said axle at one end thereof for free rotation, a main drive wheel secured on the axle at the other end thereof, means for optionally rotating the axle to propel the tractor, an axle mounted at the front of the frame and rockable about a vertical axis, front ground wheels mounted on said front axle at each end thereof for steering purposes, the front axle being less in length than the rear axle and pivoted at a point midway between its ends to the frame, at a point located in a plane lying parallel with the first mentioned ground wheels, said plane being disposed at a distance from the rear furrow ground wheel equal to one half of the length of the front axle whereby one of the front wheels is located in advance of and in a line lying between the rear wheels and the rear furrow ground wheel tracks with the other front wheels, and means for rocking said front axle about its axis for modifying or neutralizing the tendency of the main drive wheel to turn the tractor about the ground wheel loosely mounted on said axle.

In testimony whereof I affix my signature in presence of two witnesses.

CHARLES J. WHITE.

Witnesses:
J. H. GRAY,
CLAYTON THIGPEN.